United States Patent [19]
Kyoizumi

[11] Patent Number: 5,412,317
[45] Date of Patent: May 2, 1995

[54] POSITION DETECTOR UTILIZING ABSOLUTE AND INCREMENTAL POSITION SENSORS IN COMBINATION

[75] Inventor: Kozo Kyoizumi, Toyonaka, Japan
[73] Assignee: Santest Co., Ltd., Osaka, Japan
[21] Appl. No.: 48,665
[22] Filed: Apr. 16, 1993
[30] Foreign Application Priority Data Jul. 7, 1992 [JP] Japan ................................ 4-202954

[51] Int. Cl.⁶ ..................... G01B 7/14; G01D 5/12; G01D 5/244
[52] U.S. Cl. ..................... 324/207.14; 324/207.13; 324/207.21; 324/207.24
[58] Field of Search ............. 324/207.2-207.25, 324/225, 227; 341/15; 318/652, 653

[56] References Cited

U.S. PATENT DOCUMENTS

| 4,717,874 | 1/1988 | Ichikawa et al. | 324/207.22 |
| 4,719,420 | 1/1988 | Boimond | 324/207.14 |

FOREIGN PATENT DOCUMENTS

| 3123572 | 12/1982 | Germany | 324/207.23 |
| 59-162412 | 9/1984 | Japan . | |
| 61-112923 | 5/1986 | Japan . | |
| 61-137001 | 6/1986 | Japan . | |
| 2-45712 | 2/1990 | Japan . | |
| 2-150714 | 6/1990 | Japan . | |
| 2-183117 | 7/1990 | Japan . | |
| 3-74323 | 7/1991 | Japan . | |

OTHER PUBLICATIONS

Ivor Hawkes Associates, Measuring Mine Roof Movement, Jul. 1978, p. 31, (pp. 19-35).
U.K. Patent Application, GB 2243 689A, A Displacement Sensing System, Jun. 11, 1991.

Primary Examiner—Kenneth A. Wieder
Assistant Examiner—Jay M. Patidar
Attorney, Agent, or Firm—Howson & Howson

[57] ABSTRACT

An absolute type position sensor, preferably of the magnetostrictive line type, and a semi-absolute type position sensor, preferably of the magnetic induction type, are operated in parallel with each other, and their moving portions are connected to each other. Position information, obtained by the absolute type position sensor, which is outside the range of a single pitch distance for the semi-absolute position sensor, is corrected, in accordance with a detected value obtained by the semi-absolute type position sensor, by a predetermined logic. In this way accurate absolute measurements can be made over a long range of motion with extremely high accuracy.

5 Claims, 4 Drawing Sheets

POSITION DETECTOR UTILIZING ABSOLUTE AND INCREMENTAL POSITION SENSORS IN COMBINATION

BRIEF SUMMARY OF THE INVENTION

This invention relates to position detection, more particularly to electromechanical position detectors used in servo control systems and the like, and specifically to improvements in the accuracy and reliability of such detectors.

Conventional position detecting methods can be broadly classified into two categories: the incremental method and the absolute method. Incremental position detection is typically carried out by means of a linear pulse encoder. Absolute position detection can be carried out by the use of a wide variety of sensors including, for example, potentiometers, differential transformers, capacitance position sensors, eddy current position sensors, inductance position sensors and magnetostrictive position sensor.

The incremental method detects the position of an object on the basis of the distance through which it moves from a previous position which is not necessarily preestablished. Incremental position detecting systems exist which are capable of high resolution and accuracy. However, the incremental method is disadvantageous in that, if system power is turned off, memory of the previous position of the object is lost, and remains lost even if power is turned on again. Therefore, it is not possible to determine absolute position using the incremental method in the case of loss of power. Furthermore, in the incremental method, errors resulting from noise and other causes are accumulated.

The absolute method is not subject to the aforementioned drawbacks of the incremental method, because the position of the object is measured continually from an absolute origin. However, the absolute method is inferior to the incremental method in resolution and linearity. The inferiority of the resolution and linearity of the absolute method is a serious problem, especially in devices involving movements of an object through relatively long distances of the order of one meter.

A hybrid position sensor, known as a semi-absolute type position sensor, combines the incremental method and the absolute method. Such a position sensor is disclosed in Japanese Laid Open Patent Specification No. 137001/1986. The semi-absolute position sensor can detect the absolute position of an object within a predetermined range, and when the object moves outside the range, makes an incremental measurement by counting the number of times the object moves through a predetermined incremental pitch distance. The resolution and linearity of the semi-absolute position sensor are excellent, and even if power if turned off, the sensor does not lose track of the position of the object, provided it is within the predetermined range. However, if power is momentarily or temporarily lost, it becomes impossible to determine the number of times the object moves through the incremental pitch distance outside of the predetermined range. Consequently to the extent that the instrument operates outside the predetermined range of movement, it is subject to the same drawbacks as exist with the incremental method.

SUMMARY OF THE INVENTION

Accordingly, the primary objects of this invention are to overcome of the aforementioned problems inherent in the absolute, incremental and semi-absolute methods, and to provide a position detecting system capable of detecting position of an object, over a long range of movement, with high accuracy and reliability.

The position detecting system in accordance with the invention comprises first and second position sensors, the first being of the absolute type and the second being of the incremental type. It also comprises means, responsive to the outputs of both sensors, for producing an output indicative of the position of a movable object, with correcting means for correcting the output of the first sensor in accordance with the output of the second sensor.

The first position sensor detects the absolute position of the movable object over an entire stroke region and produces a first output. The second position sensor detects the position of the movable object within any one of a plurality of ranges within the stroke region and into which the stroke region is divided, the ranges being disposed within the stroke region at a uniform pitch. The second position sensor produces a second output. The first and second position sensors are operated in parallel with each other. Each comprises first and second elements. The first and second elements of each sensor are movable relative to each other, and the second elements of both position sensors are fixed to each other. The means responsive to the first and second outputs produces an output indicative of the position of the movable object within the stroke region, and the responsive means including correcting means, responsive to the second output, for effecting a correction of the position of the movable object as detected by the first position sensor.

Since the first position sensor and the second position sensor are disposed in parallel with each other and their moving portions are fixed to each other, output signals corresponding to the positions of the moving portions are produced simultaneously from both position sensors. The output of the first position sensor indicates the absolute position of the movable object from a predetermined origin. However, the output of the first position sensor is subject to error because of limitations in its resolution and linearity. On the other hand, the second position sensor has superior resolution and linearity. Therefore, by correcting the output of the first position sensor, using the output of the second position sensor, the absolute position of the movable object can be measured with extremely high accuracy over a long range of movement.

In accordance with the invention, for the first sensor, a magnetostrictive sensor is preferred, and for the second sensor, a magnetic induction sensor is preferred. Preferably the magnet of the magnetostrictive sensor and the rod of the magnetic induction sensor are fixed to each other. If the magnet is a permanent magnet mounted on the rod, an extremely compact and simple structure can be realized.

Preferably, the first position sensor is a magnetostrictive type position sensor comprising a magnetostrictive line extending along an axis, a magnet movable along and adjacent to the magnetostrictive line, means for applying current pulses in an axial direction to the magnetostrictive line, thereby generating a torsional elastic wave in the magnetostrictive line at a position adjacent to the location of the magnet, receiver means, located at a predetermined position along the magnetostrictive line and responsive to said torsional elastic wave, and means for measuring the propagation time of the torsional elastic wave from the location of said magnet to the location of the receiver means, whereby the mechanical position of the magnet is detected. The second position sensor is preferably a magnetic induction type position sensor which comprises an elongated rod, movable along the direction of its elongation, and having magnetic pole elements disposed along its length at a predetermined pitch, a plurality of magnetic detection elements disposed in proximity to the rod, each magnetic detecting element being responsive to the magnetic field at a predetermined location along the length of, and in the proximity of, the rod, and producing an electrical signal in response to said magnetic field, and means, responsive to the electrical signals produced by the detecting elements, for producing an alternating current electrical signal the phase of which varies in accordance with the position of the rod relative to the magnetic pole elements of the rod.

The preferred embodiment of the invention further includes a signal processing circuit for converting the output of the magnetostriction position sensor into a first digital signal corresponding to the position of the magnet, and a phase-responsive circuit for converting the output of the magnetic induction position sensor into a second digital signal corresponding to the position of the rod. The means for producing an output indicative of the position of the movable object within the stroke region, comprises arithmetic and logic circuit means responsive to said first and second digital signals.

Further objects, details and advantages of the invention will be apparent from the following detailed description, when read in conjunction with the drawings.

DETAILED DESCRIPTION

Figure 1:
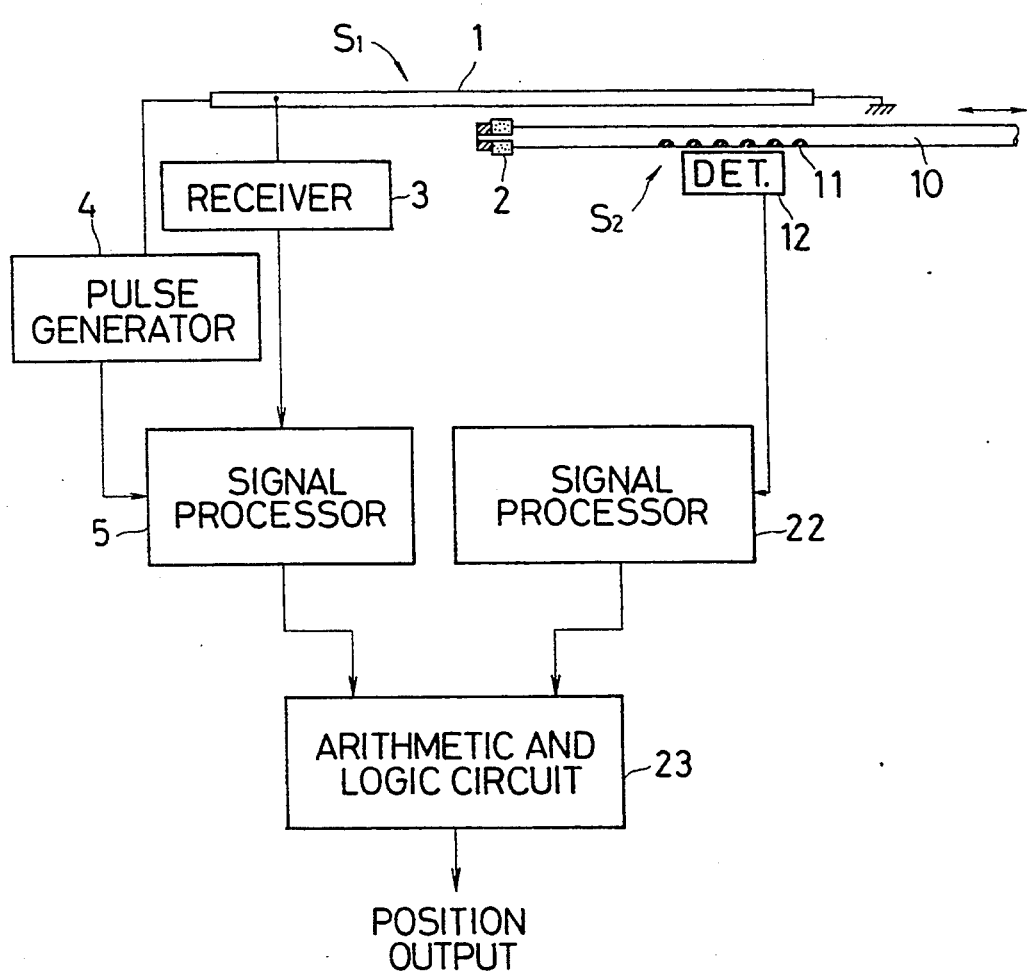
FIG. 1 is a schematic diagram a position detecting system embodying the invention.

The position detecting system of FIG. 1 comprises a magnetostrictive type sensor $S_1$ and a magnetic induction type sensor $S_2$. The magnetostrictive sensor $S_1$ comprises a magnetostrictive line 1 which is mechanically supported under tension, a permanent magnet 2, which is movable along the magnetostrictive line 1, a receiver 3 disposed near one end of the magnetostrictive line 1, and a current pulse generating circuit 4 which is connected to the same end of the magnetostrictive and which applies a current pulse to the magnetostrictive line 1. A detected signal from the receiver 3, and a signal from the current pulse generating circuit 4, are both fed to a magnetostriction signal processing circuit 5, which produces, in response to these two signals, a digital signal corresponding to the position of the permanent magnet 2.

Figure 2:
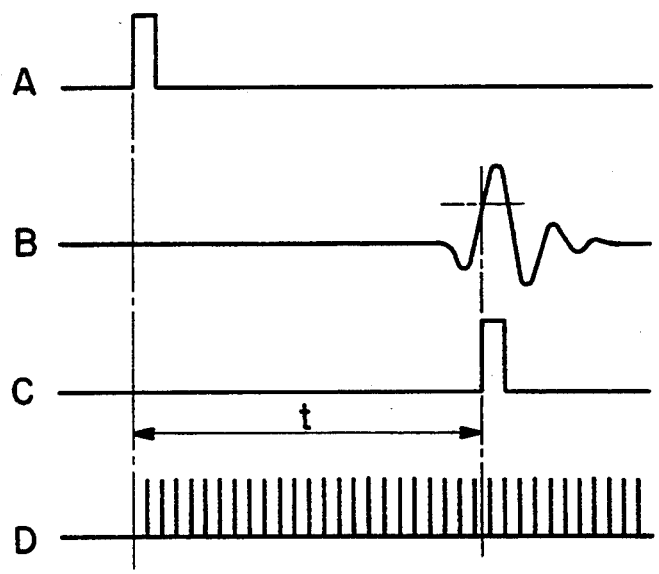
FIG. 2 is a diagram showing waveforms illustrating the operation of the magnetostrictive type sensor.

In FIG. 2, which illustrates the operation of the magnetostrictive sensor $S_1$, the pulse on time scale abscissa A represents the current pulse applied by the current pulse generating circuit 4 to the magnetostrictive line 1. The waveform on time scale abscissa B is the waveform, detected by receiver 3, of a torsional elastic wave generated at the position in magnetostrictive line 1 adjacent to permanent magnet 2. The waveform arrives at the receiver after a time interval t, and is converted into a pulse, as shown on time scale abscissa C, by suitable pulse-shaping circuitry. If v is the inherent propagation speed of the torsional elastic wave in the magnetostrictive medium, the absolute position x of the permanent magnet 2 is given by the following equation:

$$x = v \cdot t$$

If a clock, producing pulses shown on abscissa D, is started by current pulse at A and is stopped at the onset of pulse C, the propagation time t can be detected easily as a digital signal.

The magnetic induction type sensor $S_2$ comprises a rod 10 disposed in parallel with magnetostrictive line 1. Sensor $S_2$ also includes a detector 12, disposed in proximity to rod 10. The sensor $S_2$ and the rod 10 are relatively movable in the direction of elongation of rod 10.

Figure 3:
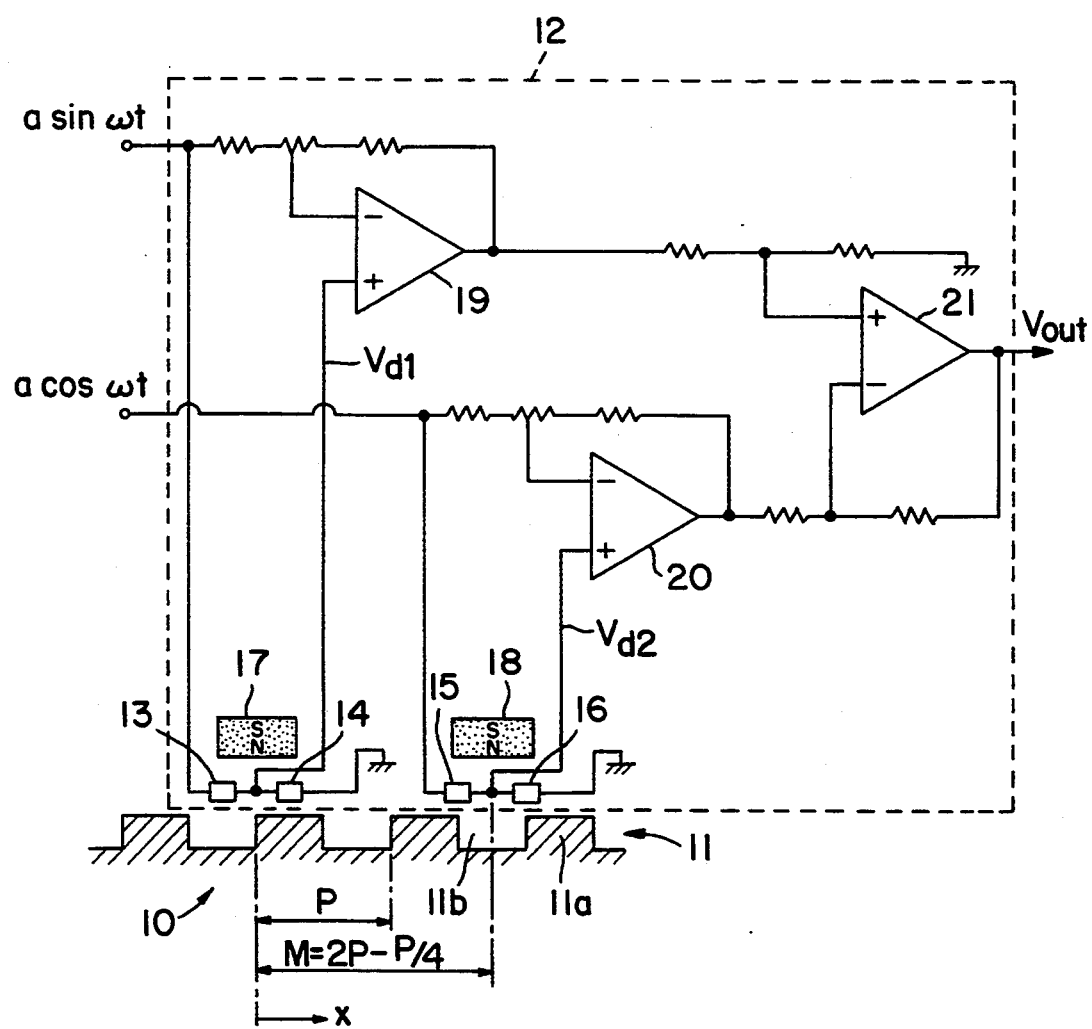
FIG. 3 is a schematic diagram of the principal components of the magnetic induction type sensor.

As shown in FIG. 3, rod 10 is provided, on its exterior 11, with magnetic pole elements 11a separated by non-magnetic portions 11b. The magnetic pole elements and the non-magnetic portions are of equal length and are disposed along the length of rod 10 at a uniform pitch P.

Permanent magnet 2 of the magnetostrictive sensor is fixed to rod 10 at or near one of its ends, while the opposite end of the rod is connected to a movable object (not shown) the position of which is to be detected.

The detector 12 contains four magnetoresistance elements 13, 14, 15 and 16, and two permanent magnets 17 and 18 for biasing. The magnetoresistance elements 13–16 are supplied with an alternating current signal which is amplitude-modulated in accordance with the position of the magnetic pole elements of the rod relative to the magnetoresistance elements. Ultimately, the electrical outputs of the magnetoresistance elements are combined to provide a signal the phase shift of which corresponds to the relative position of the magnetoresistance elements and the rod within a given pitch interval P.

Magnetoresistance elements 13 and 14 are connected in series and constitute one set, and magnetoresistance elements 15 and 16 are also connected in series to constitute another set. The distance between a point on elements 13 and a corresponding point on element 14 is P/2. Similarly, the distance from a point on element 15 to a corresponding point on element 16 is P/2 so that, as the rod moves, the magnetic resistances of the two elements in each set are 180° out of phase with each other. The center-to-center distance M between the two sets of magnetoresistance elements differs, by P/4, from an integral multiple of the pitch P. In the example shown in FIG. 3, the center-to-center distance M is $$M = 2P - \frac{P}{4}$$

A sine wave voltage $a \sin \omega t$ is applied to one end of the series combination of magnetoresistance element 13 and 14 while the other end is grounded. Similarly, a cosine wave voltage $a \cos \omega t$ is applied to one end of the series combination of magnetoresistance elements 15 and 16 while the other end is grounded. Output voltages $V_{d1}$ and $V_{d2}$ are taken from junction of elements 13 and 14 and from the junction of elements 15 and 16, respectively. The magnetoresistance elements are disposed between the rod and permanent magnets 17 and 18, and the magnetic pole directions of the permanent magnets are disposed so that the magnetic flux passes through elements 13–16 and approaches rod 10 approximately perpendicularly. The AC voltages a sin$\omega$t and a cos$\omega$t, which are applied to the sets of magnetoresistance elements can be generated easily, using a known quadrature circuit or the like.

Output voltages $V_{d1}$ and $V_{d2}$ are fed to "plus" input terminals of operational amplifiers 19 and 20, respectively, the outputs of which are connected respectively to the "plus" and "minus" inputs of operational amplifier 21, which produces an output proportional to the difference between $V_{d1}$ and $V_{d2}$. By appropriate choice of the resistance values in the circuit, $V_{d1}$ and $V_{d2}$ correspond respectively to a sin$\omega$t and a cos$\omega$t, amplitude-modulated, in accordance with the position of the rod 10 relative to the magnetoresistance elements, by modulating signals which are 90° out of phase with each other. By virtue of a well-known trigonometric identity, the difference output, $V_{out}$ takes the simple form $$V_{out} = b\sin\left(\omega t - \frac{2\pi x}{P}\right)$$

Figure 4:
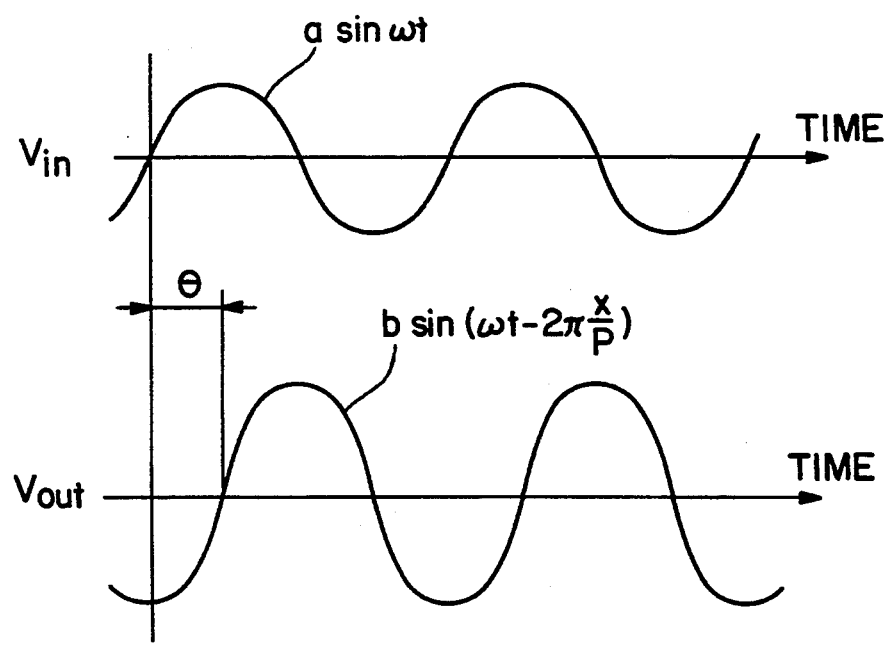
FIG. 4 is a diagram showing waveforms illustrating the operation of the magnetic induction type sensor.

FIG. 4 illustrates input voltage $V_{in}$=a sin$\omega$t and output voltage $V_{out}$. By detecting a phase difference $\theta=2\pi x/P$ between these voltages, it is possible to detect the absolute position x of the rod 10 within the range of one pitch distance. Outside this range, the linear displacement x of the rod can be measured incrementally by counting the number of times the rod moves through the pitch distance.

The input and output signals, $V_{in}$ and $V_{out}$, of the detector 12 are fed to a phase difference signal processing circuit 22 (FIG. 1), in which the phase difference $\theta$ between the two signals is converted to digital form. This conversion can be carried out easily by known analog-to digital converters. The digital signals from the magnetostriction signal processing circuit 5 and the phase difference signal processing circuit 22 are fed to an arithmetic and logic circuit 23, which, in turn, performs arithmetic operations. Circuit 23 delivers a final output indicating the absolute position x of the permanent magnet 2, and therefore, the absolute position of rod 10 and of the movable object attached to it.

Specific details of the magnetostrictive type sensor $S_1$, as well as variations thereon, are well known, and are described, for example, in Japanese Laid Open Patent Specifications 112923/1986 and 183117/1990 and Japanese Laid Open Utility Model No. 74323/1991. Likewise, specific details of the magnetic induction type sensor $S_2$, are well known, and are described, for example, in Laid Open Japanese Patent Specifications 137001/1986, 45712/1990 and 150714/1990.

In the magnetostrictive type sensor $S_1$, as described above, the position of the permanent magnet 2 is determined by measuring time t using clock pulses generated by a crystal oscillator. In this way, it is possible to convert the absolute position x into a digital signal. However, the limit of linearity is approximately ±0.05% or so over the full scale and it has not been possible to obtain better linearity in practice. Therefore, in the case of a magnetostrictive type sensor wherein an object moves through a relatively long distance, for example one meter (1000 mm), $$\pm 0.05 \times 1/100 \times 1000 \; mm = \pm 0.5 \; mm$$

That is, the error resulting from nonlinearity is ±0.5 mm at minimum.

The response characteristic of the magnetostrictive type sensor $S_1$ is restricted by the torsional elastic wave propagating through the magnetostrictive line 1. If this speed is assumed to be 3 mm/$\mu$sec, then for the measurement of 1,000 mm, the time interval is:

$$1000/3 = 333 \; \mu sec$$

If the reciprocal is taken to determine the response frequency, the result is:

$$1/0.333 \; msec = 3 \; Khz$$

This is a theoretical limit, corresponding to about 1 to 2 Khz in a practical design. The longer the length to be measured, the smaller the response frequency is. For this reason, it is difficult for a magnetostrictive sensor to detect the position of an object which is moving at high speed.

On the other hand, in the magnetic induction type sensor $S_2$, an AC signal $V_{out}$ having a phase shift $\theta$, proportional to the displacement of the rod 10, is obtained from the applied AC signal $V_{in}$. By obtaining the phase difference $\theta$, the absolute position of the rod 10, within the range of one pitch distance, can be determined digitally.

If the pitch P of the magnetic pole elements formed on rod 10 is 10 mm, and the frequency of the input signal $V_{in}$ is 10 Khz, then, by using a clock pulse of 10 Mhz, a resolution of 0.01 mm can be easily obtained, as shown by the following:

$$\frac{10 \times 10^3}{10 \times 10^6} \times 10 \; mm = 0.01 \; mm$$

The response characteristics of the magnetic induction type sensor $S_2$ can be rendered superior to those of the magnetostrictive type sensor $S_1$ by choosing an appropriately high frequency for the input signal $V_{in}$.

Thus, within the range of one pitch distance, the magnetic induction type sensor $S_2$ has an extremely high accuracy and is superior in its response characteristics, but is disadvantageous in that, when the range of a single pitch distance is exceeded, the sensor follows the incremental method.

In accordance with the invention, the number of times the single pitch distance is exceeded is determined by the magnetostrictive sensor $S_1$. Consequently, the drawbacks of the two types of sensors are compensated for, and a position detecting system is obtained which is capable of measuring the distance through which an object moves, in an absolute manner over a wide range, with very high resolution with superior response characteristics.

In the arithmetic and logic circuit 23, the absolute position x of the permanent magnet 2, and the absolute position of rod 10, are obtained from the digital output of the magnetostriction signal processing circuit 5, derived from sensor $S_1$ and the digital output of the phase difference signal processing circuit 22, derived from sensor $S_2$. If the detected values from both sensors $S_1$ and $S_2$ are in exact agreement with each other, no problem will arise. However, in practice, such agreement is not always obtained. Disagreement between the detected values can occur because, if operating power is momentarily lost by sensor $S_2$, information concerning the number of pitch distances through which the sensor rod has moved is extinguished.

In the case where the detected values determined by both sensors differ from each other, the arithmetic and logic circuit 23 performs the logical processing tabulated below in order to obtain a true value of x. In the following table, the accuracy of the magnetostrictive type sensor $S_1$ is assumed to be ±3 mm with a margin of safety, and the pitch of the magnetic pole elements 11a of the magnetic induction sensor $S_2$ is assumed to be 10 mm.

TABLE 1

| 1 mm Digit Sensor $S_1$ Detected Value | 1 mm Digit Sensor $S_2$ Detected Value | Method of Logical Processing |
|---|---|---|
| 0, 1, 2 | 7, 8, 9 | Subtract 10 mm from the 10 mm digit from sensor $S_1$. Use this, the 100 mm digit, and any higher order digits, for the absolute position. Use the one millimeter digit and lower order digits from $S_2$. |
| all the values (0-9) | 3, 4, 5, 6 | Use the 10 mm digit from sensor $S_1$ as it is along with any higher order digits for the absolute position. Use the one millimeter digit and any lower order digits from $S_2$. |
| 7, 8, 9 | 0, 1, 2 | Add 10 mm to the 10 mm digit from sensor $S_1$. Use this, and any higher order digits for the absolute position. Use the one millimeter digit and any lower order digits from $S_2$. |

When detected values are corrected on the basis of the above logical processing scheme, the following results are obtained.

TABLE 2

| Case | Sensor $S_1$ Detected Value | Sensor $S_2$ Detected Value | Detected Value after Correction |
|---|---|---|---|
| 1 | 120 mm | 37.56 mm | 117.56 mm |
| 2 | 122 mm | 39.56 mm | 119.56 mm |
| 3 | 125 mm | 33.56 mm | 123.56 mm |
| 4 | 127 mm | 30.56 mm | 130.56 mm |
| 5 | 129 mm | 32.56 mm | 132.56 mm |

For example, in case 1, the value detected by sensor $S_1$ is 120 mm and the value detected by sensor $S_2$ is 37.56 mm. In the value detected by sensor $S_1$, the 10 mm digit "2" as well as the 1 mm digit "0" are not necessarily correct. On the other hand, in the data from sensor $S_2$, the information pertaining to a range exceeding one pitch distance, namely, the 10 mm digit "3", and higher order digits, if any, are unreliable. In this case, the value detected by sensor $S_1$ is corrected to 110 mm and the 1 mm digit and lower order digits in the data from sensor $S_2$ are adopted to obtain a final detected value of 117.56 mm. Case 2 is similar to case 1.

In case 3, since the 1 mm digit from sensor $S_2$ is "3", the value not smaller than the 10 mm digit and higher order digits in the data from sensor $S_1$ are used for the absolute position without adjustment. The 1 mm digit and lower order digits from sensor $S_2$ are added to obtain a final detected value of 123.56 mm.

In case 4, since the 1 mm digit from sensor $S_1$ is "7" and the one mm digit from sensor $S_2$ is "0", 10 mm is added to the 100 mm digit from sensor $S_1$, and the 10 mm digit and higher order digits, as thus adjusted, are used as absolute position. Therefore, the detected value for sensor $S_1$ is corrected to 130 mm and the 1 mm digit and lower order digits from sensor $S_2$ are added to obtain a final detected value of 130.56 mm. Case 5, is similar to case 4.

In each case, the arithmetic and logic circuit, in correcting the absolute distance information derived from the magnetostrictive sensor $S_1$, is responsive not only to the information derived from sensor $S_2$, but also to the information derived from sensor $S_1$, in that the choice of the logic branch to be followed is dependent upon the value of the 1 mm digit in the information derived from Sensor $S_1$.

The logical scheme of Table 1 is applicable where the speed of movement of the object to be detected is sufficiently lower than the response limit speed of the magnetostrictive type sensor $S_1$. For example, if the response frequency of the sensor $S_1$ is 1 kHz, a response limit speed for keeping track of information of 10 mm or more is as follows:

$$10 \text{ mm}/1 \text{ msec} = 10 \text{ m/sec}$$

When the displacement speed exceeds 10 m/sec, the magnetostrictive type sensor $S_1$ can no longer follow the displacement.

On the other hand, if the response frequency of the magnetic induction sensor $S_2$ is 10 kHz, then for keeping track of information of 10 mm or more as an incremental measurement, the displacement speed is:

$$10 \text{ mm}/0.1 \text{ msec} = 100 \text{ m/sec}$$

Figure 5:
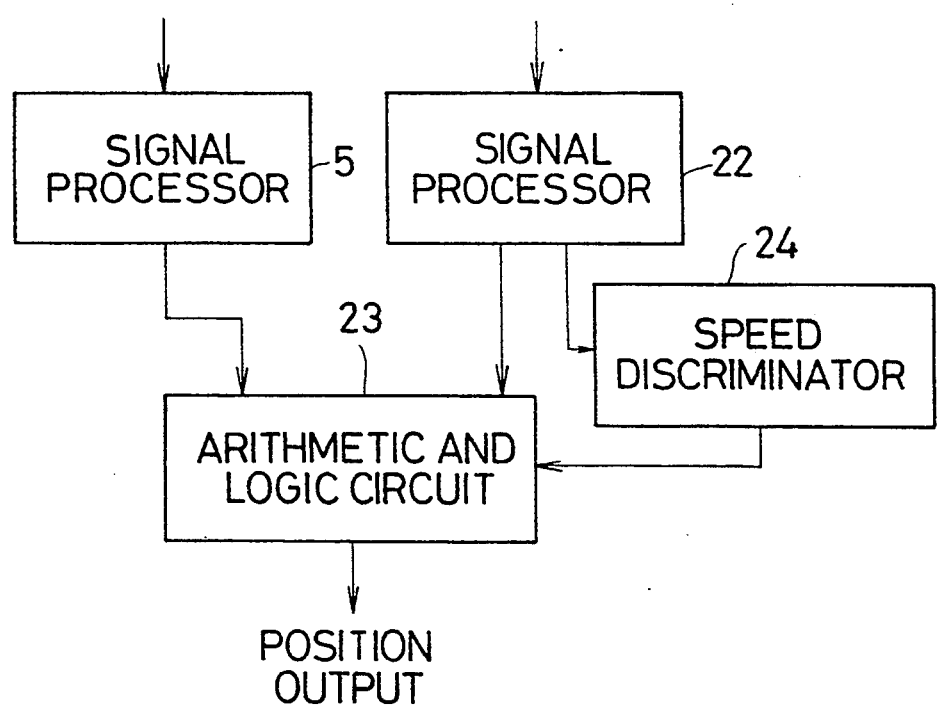
FIG. 5 is a block diagram illustrating a modified embodiment of the invention.

This displacement speed of 100 m/sec is the theoretical limit speed for the position detecting system of this embodiment. Even when the moving speed of an object is below 100 m/sec, the logic scheme of Table 1 does not allow accurate detection of the position of the moving object, because, at any given time, the information detected and delivered by the magnetostrictive sensor $S_1$ is obsolete and does not correspond to the information detected and delivered by the magnetic induction sensor $S_2$. This problem can be avoided by providing a speed discriminating circuit 24, as in FIG. 5. The speed discriminating circuit judges the speed of the moving object on the basis of the signal provided by the magnetic induction type $S_2$. The arithmetic and logic circuit 23 can be caused to make a logical judgment different from that shown in Table 1 in the case in which the moving object to be detected is moving at high speed. Alternatively, a command can be issued to deliver the output signal of the phase difference signal processing circuit 22 as it is, while the output of the magnetostrictive sensor $S_1$ is ignored. In either case, it is possible to detect the displacement of an object moving at high speed.

In summary, according to the invention, an absolute type position sensor and a semi-absolute type position sensor are operated in parallel with each other and their moving portions are connected to each other. A position, obtained by the absolute type position sensor, which is outside the range of a single pitch distance for the semi-absolute position sensor, is corrected in accordance with a detected value obtained by the semi-absolute type position sensor. In this way accurate absolute measurements can be made over a long range of motion with extremely high accuracy.

The above-described embodiments are only examples of ways in which the invention can be practiced. Various modifications other than those specifically described above can be made to the invention.

For example, although in the above embodiments, the permanent magnet 2 of the magnetostrictive sensor $S_1$ is fixed to rod 10 of the magnetic induction sensor $S_2$, the rod 10 is fixed and the detector 12 can be made movable, in which case the permanent magnet 2 would be fixed to detector 12.

For the magnetostrictive line of the magnetostrictive sensor $S_1$, a solid line may be used, or, optionally, there may be used a tubular magnetostrictive line such as that described in Japanese Laid Open Patent Specification 162412/1984, wherein a conductor for current pulse flow is inserted along the axis of the magnetostrictive line.

The shape of the permanent magnet used in the above embodiments is not specially limited. For example, the magnet may be of an annular shape, U-shaped, or in the shape of a rectangular parallelepiped. The magnetic field direction of the permanent magnet is not necessarily limited to the direction of the axis of the magnetostrictive line; it may oriented in a radial direction.

While a magnetostrictive sensor is preferred as the first position sensor other types of sensors can be used, including such sensors as potentiometers, differential transformers, capacitance type position sensors, eddy current type position sensors, or inductance type position sensors. In the second position sensor, the magnetic induction elements can be magnetoresistance element, a Hall elements, or coils. Instead of the magnetic induction elements, elements utilizing capacitance may be used. The magnetic pole elements on the rod of the second position sensor may consist of alternating poles of opposite magnetic polarity.

Numerous other modifications can be made to the invention described herein without departing from the scope of the invention as defined in the following claims.

I claim:

1. A position detecting system for determining the position of a movable object within a stroke region, including:

means, comprising a first position sensor, for detecting the absolute position of said movable object over the entire stroke region and producing a first output;

means, comprising a second position sensor, for detecting the position of said movable object within any one of a plurality of ranges within said stroke region and into which said stroke region is divided, said ranges being disposed within said stroke region at a uniform pitch, and said second position sensor producing a second output;

the first and second position sensors being independent of each other, and operated in parallel with each other, each of said position sensors comprising first and second elements, the first and second elements of each sensor being movable relative to each other, and the second elements of both position sensors being fixed to each other; and means responsive to said first and second outputs for producing an output indicative of the position of said movable object within said stroke region, said responsive means including correcting means, responsive to said second output, for effecting a correction of the position of said movable object as detected by said first position sensor.

2. A position detecting system according to claim 1, wherein:

the first position sensor is a magnetostrictive type position sensor comprising a magnetostrictive line extending along an axis, a magnet movable along and adjacent to said magnetostrictive line, means for applying current pulses in an axial direction to said magnetostrictive line, thereby generating a torsional elastic wave in the magnetostrictive line at a position adjacent to the location of the magnet, receiver means, located at a predetermined position along said magnetostrictive line and responsive to said torsional elastic wave, and means for measuring the propagation time of the torsional elastic wave from the location of said magnet to the location of said receiver means, whereby the mechanical position of the magnet is detected; and the second position sensor is a magnetic induction type position sensor which comprises an elongated rod, and having magnetic pole elements disposed along its length at a predetermined pitch, a plurality of magnetic detection elements disposed in proximity to said rod, said rod and said magnetic detecting elements being relatively movable along the direction of elongation of the rod, each magnetic detection element being responsive to the magnetic field at a predetermined location along the length of, and in the proximity of, said rod and producing an electrical signal in response to said magnetic field, and means, responsive to the electrical signals produced by said detection elements, for producing an alternating current electrical signal the phase of which varies in accordance with the position of said rod relative to said magnetic detection elements.

3. A position detecting system according to claim 2, wherein said magnet of the magnetostrictive type position sensor and said rod of the magnetic induction type position sensor are fixed to each other.

4. A position detecting system for determining the position of a movable object within a stroke region, including:

means, comprising a first position sensor, for detecting the absolute position of said movable object over the entire stroke region and producing a first output;

means, comprising a second position sensor, for detecting the position of said movable object within any one of a plurality of ranges within said stroke region and into which said stroke region is divided, said ranges being disposed within said stroke region at a uniform pitch, and said second position sensor producing a second output;

the first and second position sensors being operated in parallel with each other, each of said position sensors comprising first and second elements, the first and second elements of each sensor being movable relative to each other, and the second elements of both position sensors being fixed to each other; and means responsive to said first and second outputs for producing an output indicative of the position of said movable object within said stroke region, said responsive means including correcting means, responsive to said second output, for effecting a correction of the position of said movable object as detected by said first position sensor;

wherein the first position sensor is a magnetostrictive type position sensor comprising a magnetostrictive line extending along an axis, a magnet movable along and adjacent to said magnetostrictive line, means for applying current pulses in an axial direction to said magnetostrictive line, thereby generating a torsional elastic wave in the magnetostrictive line at a position adjacent to the location of the magnet, receiver means, located at a predetermined position along said magnetostrictive line and responsive to said torsional elastic wave, and means for measuring the propagation time of the torsional elastic wave from the location of said magnet to the location of said receiver means, whereby the mechanical position of the magnet is detected; and wherein the second position sensor is a magnetic induction type position sensor which comprises an elongated rod, and having magnetic pole elements disposed along its length at a predetermined pitch, a plurality of magnetic detection elements disposed in proximity to said rod, said rod and said magnetic detecting elements being relatively movable along the direction of elongation of the rod, each magnetic detection element being responsive to the magnetic field at a predetermined location along the length of, and in the proximity of, said rod and producing an electrical signal in response to said magnetic field, and means, responsive to the electrical signals produced by said detection elements, for producing an alternating current electrical signal the phase of which varies in accordance with the position of said rod relative to said magnetic detection elements;

and further including:

magnetostriction signal processing circuit means for converting said first output into a first digital signal corresponding to the position of said magnet; and phase-responsive circuit means for converting said second output into a second digital signal corresponding to the position of said rod; and in which said means responsive to said first and second outputs for producing an output indicative of the position of said movable object within said stroke region, comprises arithmetic and logic circuit means responsive to said first and second digital signals.

5. A position detecting system for determining the position of a movable object within a stroke region, including:

means, comprising a first position sensor, for detecting the absolute position of said movable object over the entire stroke region and producing a first output;

means, comprising a second position sensor, for detecting the position of said movable object within any one of a plurality of ranges within said stroke region and into which said stroke region is divided, said ranges being disposed within said stroke region at a uniform pitch, and said second position sensor producing a second output;

the first and second position sensors being operated in parallel with each other, each of said position sensors comprising first and second elements, the first and second elements of each sensor being movable relative to each other, and the second elements of both position sensors being fixed to each other; and means responsive to said first and second outputs for producing an output indicative of the position of said movable object within said stroke region, said responsive means including correcting means, responsive to said second output, for effecting a correction of the position of said movable object as detected by said first position sensor;

wherein the first position sensor is a magnetostrictive type position sensor comprising a magnetostrictive line extending along an axis, a magnet movable along and adjacent to said magnetostrictive line, means for applying current pulses in an axial direction to said magnetostrictive line, thereby generating a torsional elastic wave in the magnetostrictive line at a position adjacent to the location of the magnet, receiver means, located at a predetermined position along said magnetostrictive line and responsive to said torsional elastic wave, and means for measuring the propagation time of the torsional elastic wave from the location of said magnet to the location of said receiver means, whereby the mechanical position of the magnet is detected; and wherein the second position sensor is a magnetic induction type position sensor which comprises an elongated rod, and having magnetic pole elements disposed along its length at a predetermined pitch, a plurality of magnetic detection elements disposed in proximity to said rod, said rod and said magnetic detecting elements being relatively movable along the direction of elongation of the rod, each magnetic detection element being responsive to the magnetic field at a predetermined location along the length of, and in the proximity of, said rod and producing an electrical signal in response to said magnetic field, and means, responsive to the electrical signals produced by said detection elements, for producing an alternating current electrical signal the phase of which varies in accordance with the position of said rod relative to said magnetic detection elements;

wherein said magnet of the magnetostrictive type position sensor and said rod of the magnetic induction type position sensor are fixed to each other, and further including:

magnetostriction signal processing circuit means for converting said first output into a first digital signal corresponding to the position of said magnet; and phase-responsive circuit means for converting said second output into a second digital signal corresponding to the position of said rod; and in which said means responsive to said first and second outputs for producing an output indicative of the position of said movable object within said stroke region, comprises arithmetic and logic circuit means responsive to said first and second digital signals.

* * * * *